Patented Aug. 1, 1933

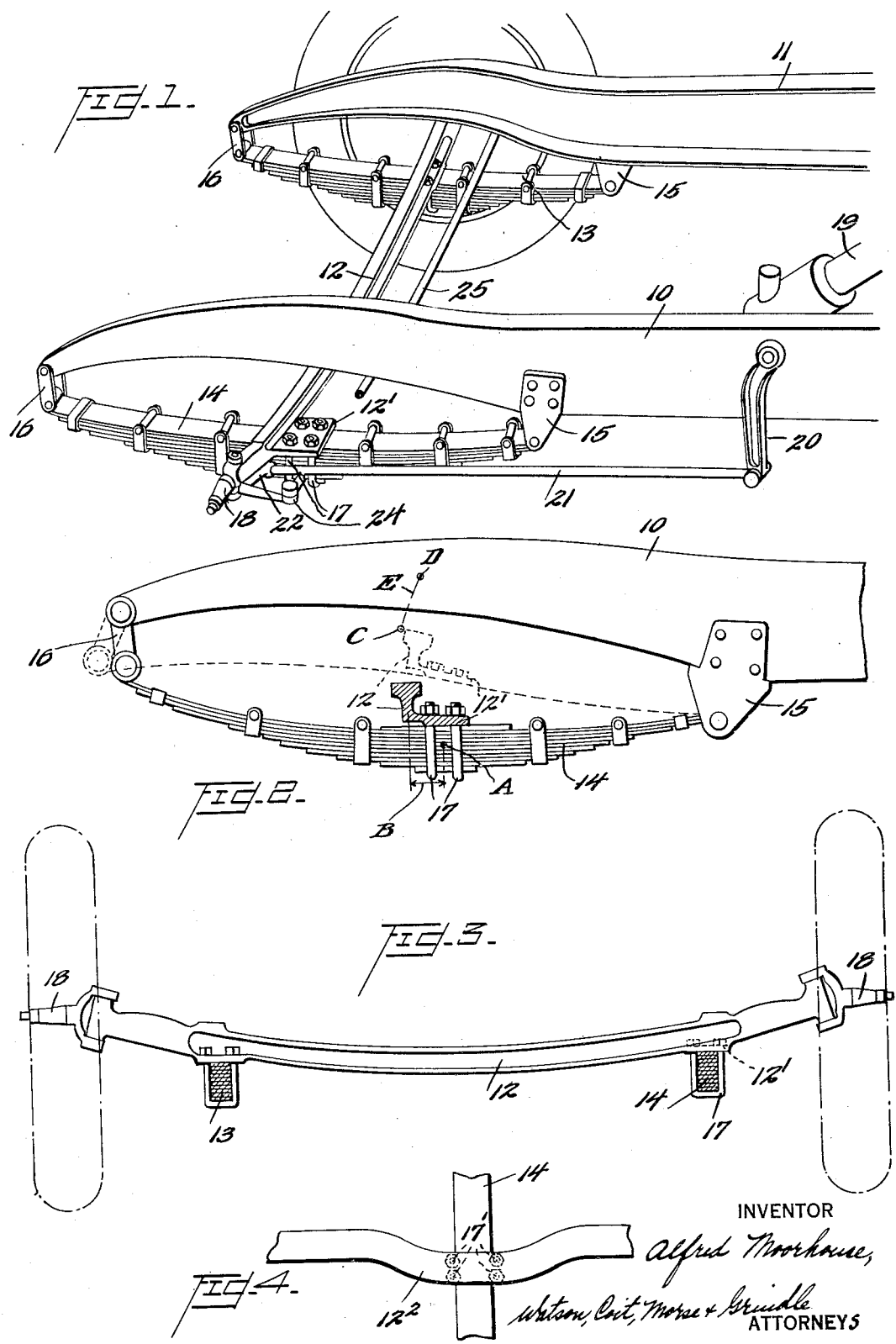

1,920,425

UNITED STATES PATENT OFFICE 1,920,425

MOTOR VEHICLE

Alfred Moorhouse, Detroit, Mich., assignor to Packard Motor Car Company, Detroit, Mich., a Corporation of Michigan Application May 3, 1930. Serial No. 449,491

10 Claims. (Cl. 280—106.5)

This invention relates to motor vehicles and particularly to motor vehicle front end spring suspensions.

Prior to the introduction of balloon or low pressure tires and four-wheel brakes, little difficulty was met with by manufacturers in designing and supplying motor vehicles capable of being steered with ease and facility and which at the same time were not subject to front end vibrations of objectionable nature when moving at relatively high speeds or over uneven surfaces. In the effort to better the riding qualities of automobiles, however, the low pressure or balloon tire was adopted, and to increase the ability of the operator to quickly reduce driving speed, brakes were added to the front wheels. While these changes have been accepted as material advances by the automotive industry, increasing the comfort and safety of automobile drivers and passengers, it has been found that the adoption of each has resulted in modification of the action of the vehicle front end in an unfavorable manner, causing or promoting vibratory movements of the wheels, front axle, and radiator or hood, which are disagreeable to the operator, injurious to the vehicle, and frequently dangerous. Furthermore, the steering qualities of vehicles so equipped have been detrimentally affected, the oscillation of the various parts of the vehicle front end in many instances producing what is termed "kick-back" through the steering gear, which is dangerous and annoying to the operator.

Various explanations of the possible causes of these movements of the various parts or elements of the vehicle front end, which movements have been called "shimmy", "wheel-tramp", "wheel-wobble", "radiator shimmy", and "steering wheel kick", have heretofore been advanced, but, inasmuch as the subject is one of considerable complexity, and explanation is lengthy as well as unnecessary to a full explanation of the present invention, none will be herein given, in the interest of conciseness. It may be generally stated, however, that the front tires and wheels of a motor vehicle, together with the axle, steering mechanism, chassis springs, frame, and the ground or base upon which the vehicle moves, comprise what may be designated a mass elastic system, possessing in the usual case a definite frequency of vibration, and that the substitution of low pressure for high pressure tires and the increase in weight of the front wheels due to the addition thereto of brake drums, etc., have tended not only to cause the system to vibrate in a prolonged manner when vibratory movement is once started but also to excite vibrations more frequently, particularly at certain vehicle speeds. By decreasing the tire pressure, the natural period of vibration of the front axle in a transverse plane is lengthened, and by increasing the weight of the front wheels, the gyroscopic forces which they may develop are increased, which in turn results in a lowering of the natural frequency of vibration of the system to such point that a periodically recurring exciting force can cause resonance or prolonged and violent vibration.

It has heretofore been proposed that the tendency of a motor vehicle equipped with balloon tires to shimmy, etc., may be wholly eliminated, or at least greatly reduced, by securing one of the forward springs to the chassis in a novel manner so that the action of this spring is somewhat different from the action of the companion spring on the opposite side of the vehicle. By so modifying the relative actions of the two supporting springs, the tendency of these springs to react synchronously is largely destroyed, with the result that periodic vibration of the frame, axle, and wheels is practically prevented. Thus, in the United States Patent No. 1,747,781, issued February 18, 1930, to Pierre Lemaigre, a spring construction is disclosed in which the left-hand forward spring is connected to the vehicle frame, at the front by the usual shackle link, and at the rear by a pivoted bracket which permits the rear end of the spring to move longitudinally relatively to the chassis side frame member, through limited distances under certain circumstances. This form of spring suspension has proven eminently satisfactory in practice.

The present invention contemplates a novel form of spring suspension designed to function in a manner somewhat analogous to the spring suspension disclosed in the Lemaigre patent above referred to but differing widely therefrom in details of construction. Instead of connecting one spring to the adjacent side frame member in a special manner, as a Lemaigre, both springs are preferably connected thereto in a conventional way, in the usual case by pivots at their rear ends and shackle links at their forward ends. The front axle is, however, not connected to both springs in the conventional manner. Thus, I contemplate securing the axle to the right-hand spring by the usual spring clips and at the usual point of connection, generally midway of the length of the spring, but connecting it to the left-hand spring at a point rearwardly of a plane transverse to the chassis and passing through the right-hand point of spring connection.

To effect this connection of axle to left-hand spring, it is necessary to either provide the axle with a rearward extension, where it crosses the left-hand spring, or to offset the axle at this point. The relationship between the two stub axles, bearing the wheels, remains unchanged so that it may be said that the important results realized in the practice of the present invention may be attained by a simple modification of the connection between the axle and one of the springs, preferably a modification of the connection between the axle and that spring positioned adjacent the drag link of the steering mechanism. Furthermore, while the invention is described in the preceding paragraphs as consisting mainly in providing an "offset" connection between the axle and one of the springs, it will be appreciated that the invention is not limited, in its broader aspect, to a connection which may be strictly termed an "offset" connection, the primary object being to provide a front end spring suspension for motor vehicles of such character that improved riding qualities are realized, by any form of connection between the road wheels and springs.

By means of a spring suspension constructed in accordance with the invention, synchronous action of the two springs is broken up, thus greatly decreasing the tendency of the body to develop and maintain a periodic lateral vibration, the elastic system being to a considerable extent unbalanced, and the invention is also of considerable utility in decreasing wheel-wobble, which generally results from passage of the vehicle over uneven road surfaces at relatively high speeds.

In the accompanying drawing one form of the invention is illustrated by way of example.

Figure 1 is a perspective view of portion of the front end of the frame of a motor vehicle, rather diagrammatically sketched in, and also disclosing the front axle, spring suspension, wheels, and steering mechanism;

Figure 2 is an enlarged side view of one side frame member of the vehicle and the associated spring, the axle being shown in section;

Figure 3 is a side view of the front axle, the springs being shown in section and the position of the wheels diagrammatically indicated; and Figure 4 indicates in plan a modified or alternative connection between one spring and axle.

The left-hand side frame member (or the side frame member adjacent the steering elements) is indicated at 10, the right-hand member 11, the axle at 12, right-hand forward spring at 13, and left-hand forward spring at 14. Each spring may be secured to its associated side frame member in any approved manner but preferably by the means shown in the drawing, which means comprises a bracket 15, to which the rear end of the spring is pivoted, and a swinging shackle link 16, by means of which the front end of the spring is hung in such manner that it may have a slight fore and aft movement. The right-hand connection between the axle 12 and spring 13 is effected by means of U-bolts, one positioned on each side of the axle, or by any other conventional securing device or devices. The connection between the left spring 14 and axle is, however, of different nature.

Thus, the axle is either provided with a rearward extension 12′, which is secured to the spring by means of U-bolts 17, as shown in Figures 1 and 2, or the axle itself is offset rearwardly, as at $12^2$ (see Figure 4), so that the securing U-bolts 17′ pass around the spring 14 and effect a rigid connection between axle and spring, at points considerably in rear of those which they would normally occupy in the conventional construction. Where the axle is provided with a rearward extension, such as shown in Figures 1 and 2, its forward lower edge is undercut immediately above the spring, as indicated at $12^2$ in Figure 2.

At its ends the axle carries the stub axles 18 upon which the wheels are revolubly mounted, these stub axles being pivotally connected to the ends of the main axle 12 in well known manner. A steering post is indicated at 19, steering lever at 20, drag link at 21, and a steering arm 22 connects the forward end of the drag link 21 and the left-hand stub axle 18. The two stub axles are connected by the usual arms 24 (of which one only is illustrated) and the steering cross tube 25.

It will be quite apparent that, inasmuch as the springs are equally loaded but connected to the main axle at points lying in different vertical transverse planes, their reactions will not be the same if they are subjected to identical flexing forces transmitted thereto from the axle. Thus, assuming both front wheels to strike obstructions of the same height and the axle to move upwardly, as a result, into a second position parallel to its first position, it will be clear that the right-hand spring will flex in a manner entirely normal, except for a very slight twisting movement imparted thereto by the axle, whereas the left-hand spring will have a very considerable twisting force exerted thereon due to the fact that the axle will tend to swing along an arc centered upon some point in its rear, for instance, the point (or transverse horizontal line) A. In other words, at the left-hand spring the force exerted by the axle on the spring has a lever arm, which may be indicated roughly by the length of the line B in Figure 2, so that it may be considered that a very material torque is applied to the spring, tending to twist its forward portion upwardly and its rear portion downwardly. The net result of this is that, upon upward or downward motion of the axle, the springs are unequally deflected or, in other words, do not move or act in exact synchronism. Because of the twisting of one of the springs, the friction between its leaves is increased, the effect of which is to further assist in preventing shimmy. From this it follows that periodic vibration of the frame on the spring suspension is minimized, this periodic vibration only occurring when the action of the springs is substantially the same.

Naturally the axle 12, which yields only very slightly under torsional forces, tends to twist the right-hand spring in like manner, but, because of the remoteness of spring 13 from spring 14, this former spring is twisted to only a negligible extent. Also, as is apparent, there is no lever arm B at the right-hand spring, and hence no such twisting force is exerted thereon as is applied to the left-hand spring.

Assuming that, due to impact, spring 14 is deflected from its full line position (Figure 2) to its dotted line position, it also follows that the axle itself, particularly the left-hand end thereof, and the stub axle 18 have a slight rearward swinging or rocking motion about point A. Thus, if the initial position of the stub axle 18 is indicated at C in Figure 2, its final position is indicated at D, the axis of the stub axle having not only moved upwardly but also rearwardly, describing an arc indicated at E. It will be appreciated that, due to the fact that the stub axle 18 is located a considerable distance above point A, as is clear from an inspection of Figure 3, this stub axle will travel through an arc of greater length than does any point on the main axle itself, adjacent the spring. Because of this rearward movement of the stub axle, it immediately follows that the wheel has likewise a rearward movement upon the upward deflection of the left-hand spring. Recession of the left-hand stub axle upon impact, and corresponding movement of the left-hand wheel, is very helpful in avoiding wheel-wobble and back-kick in the steering mechanism.

It is known that, upon impact of a wheel, driven at relatively high speed, with an obstruction, the sudden lifting of the axis of rotation of the wheel develops forces which tend to give the wheel a right-hand turning movement, the wheel, when rapidly rotating upon its axle, being, to all intents and purposes, a gyroscope. These forces tending to rotate the wheel and stub axle to a right-hand turning position upon impact naturally tend to instigate wheel-wobble or vibratory movement of the wheels, the tendency toward such turning being opposed by the steering mechanism. There is, of course, certain elasticity in the steering mechanism which is necessarily present, it being almost universal practice, for instance, to interpose resilient means in the connection between lever 20 and drag link 21. Hence it follows that the force tending to promote right-hand turning movement of the wheel is actually able to do so in the normal case.

Where my improved spring suspension is employed, however, it is apparent that, upon impact of the wheel upon an object, the wheel and the stub axle upon which it is mounted may rock rearwardly, and this, it has been actually found in practice, substantially neutralizes the right-hand turning movement due to the development of gyroscopic forces upon sudden elevation of the stub axle. Thus, wheel-wobble is effectively prevented or so minimized as to be entirely unobjectionable. Furthermore, back-kick through the steering mechanism to the hands of the operator is substantially eliminated, the tangential force imparted on the wheel due to sudden impact being greatly relieved through the ability of the stub axle to move rearwardly to a slight extent upon such impact.

It is found that, in the case of the conventional front end spring suspension, the wheels have a tendency to shimmy when the brakes are strongly applied while the vehicle is traveling at high speed. By means of the present construction, this objectionable tendency is eliminated, undercutting the axle at the point of its connection to the left-hand spring providing a certain flexibility of the spring suspension in a forward direction which effectively prevents shimmy due to the application of the brakes.

From the above description it is thought that one skilled in the art will appreciate the advantages of the invention and have no difficulty in applying the same to automotive vehicles of various kinds, either passenger cars, busses, or trucks. The invention is in nowise limited to the exact mechanical details illustrated in the drawing, as numerous mechanical expedients may be resorted to in attaching the springs to the axles, in accomplishing the same results.

Having thus described the invention, what is claimed as new and desired to be secured by Letters Patent is:

1. In a motor vehicle, in combination, a vehicle frame having side frame members, an axle, and two vehicle springs, one disposed longitudinally of each side frame member and connected thereto, the axle being connected to each spring, the points of connection of the axle to the springs, respectively, being in different vertical planes transverse to the major axis of the vehicle.

2. In a motor vehicle, in combination, a vehicle frame having side frame members, an axle, and two vehicle springs, one disposed longitudinally of each side frame member, each spring having its ends connected to a side frame member, the forward and rearward points of connection, respectively, of the springs and side frame members lying substantially in parallel planes transverse to the major axis of the vehicle, and the axle being connected to the springs, a straight line passing through the points of connection of the axle to the springs being inclined relatively to the axis of the vehicle and the aforementioned planes.

3. In a motor vehicle, in combination, side frame members, a spring connected to each side frame member, one end of each spring being connected to its associated side frame member in such manner that longitudinal movement of such spring end relatively to the side frame member is prevented, an axle extending transversely of the vehicle and terminating in movable stub axles, road wheels rotatably mounted on said stub axles, and connections between the axle and both springs, the axle contacting with the springs at points below a line connecting the stub axles and the effective connection between the axle and one of the springs being in rear of a vertical plane passing through the stub axles.

4. In a motor vehicle, in combination, side frame members, longitudinally extending vehicle springs, one connected to each side frame member, road wheels, interconnected stub axles upon which said wheels are rotatably mounted, and an axle to the ends of which said stub axles are pivoted, said axle being connected to the springs at points below a line connecting the stub axles, and the point of connection of the axles to one spring being to the rear of a vertical plane including said line.

5. In a motor vehicle, in combination, side frame members, longitudinally extending vehicle springs, one connected to each side frame member, road wheels, interconnected stub axles upon which said wheels are rotatably mounted, and an axle to the ends of which said stub axles are pivoted, said axle passing over the springs and being connected thereto, respectively, below a horizontal plane through the stub axles, and the point of connection of the axle to one spring being to the rear of a vertical plane including the stub axles, so that the adjacent stub axle may have a slight rearward swinging movement about said point of connection upon upward movement of the axle relatively to the side frame members.

6. In a motor vehicle, in combination, side frame members, a spring connected to each side frame member, two road wheels, an axle upon the ends of which the road wheels are rotatably mounted, said axle extending transversely of the vehicle and having a lateral extension where it crosses one of the springs, which extension is rigidly secured to the adjacent spring by suitable means, the body of the axle being spaced from said spring, for the purpose set forth.

7. In a motor vehicle, in combination, a vehicle frame having spaced side frame members, a spring connected to each side frame member, said springs being similarly formed and substantially equal in length and stiffness, an axle extending transversely of the side frame members and springs, and independent means connecting the springs to the axle respectively, one such means connecting the associated spring to the axle at a point along the spring which differs substantially from the point of connection of the second spring to the axle, so that the springs are unequally distorted upon the occurrence of movement of the axle relatively to the frame while remaining substantially parallel to the plane of the side frame members.

8. In a motor vehicle, in combination, two side frame members, two vehicle springs of substantially the same form and capacity, means connecting one spring to its associated side frame member and substantially similar means connecting the second spring to its associated side frame member, road wheels, stub axles upon which said wheels are rotatably mounted, and means connecting the stub axles to the springs respectively, one such means being effectively attached to its associated spring at a point which does not correspond to the point of attachment of the other such means to the second spring, so that the springs are unequally distorted when the stub axles move simultaneously toward the side frame members through equal distances.

9. In a motor vehicle, in combination, a vehicle frame having spaced side frame members, a spring connected to each side frame member, said springs being similarly formed and substantially equal in length and stiffness, a continuous substantially rigid axle extending transversely of the side frame members and springs, and separate means connecting the springs to the axle respectively, one such means being effectively and rigidly attached to its associated spring at a point which does not correspond, as a load applying point, to the point of attachment of the other such means to the second spring, whereby the springs are unequally distorted upon the occurrence of movement of the axle relatively to the frame, while remaining substantially parallel to the plane of the side frame members.

10. The combination set forth in claim 9 in which the rigid axle has a rearwardly extending rigid portion adjacent one spring, this rearwardly extending portion being secured to the associated spring and the axle being otherwise unconnected to said spring.

ALFRED MOORHOUSE.